(12) United States Patent
Carter et al.

(10) Patent No.: US 10,274,016 B2
(45) Date of Patent: Apr. 30, 2019

(54) TURBINE ENGINE BEARING ASSEMBLY AND METHOD FOR ASSEMBLING THE SAME

(71) Applicant: GENERAL ELECTRIC COMPANY, Schenectady, NY (US)

(72) Inventors: Bruce Alan Carter, West Chester, OH (US); Anand Madihalli Srinivasan, Bangalore (IN); Satish K. Yadav, Bangalore (IN); Ravindra Shankar Ganiger, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/471,352

(22) Filed: Mar. 28, 2017

(65) Prior Publication Data

US 2018/0283456 A1 Oct. 4, 2018

(51) Int. Cl.
*F16C 35/04* (2006.01)
*F16C 35/067* (2006.01)
*F01D 25/16* (2006.01)

(52) U.S. Cl.
CPC .......... *F16C 35/067* (2013.01); *F01D 25/162* (2013.01); *F16C 35/042* (2013.01); *F05D 2230/60* (2013.01); *F05D 2250/183* (2013.01); *F05D 2250/281* (2013.01); *F05D 2260/31* (2013.01); *F16C 2360/23* (2013.01)

(58) Field of Classification Search
CPC ...... F16C 27/04; F16C 27/045; F16C 27/066; F16C 35/042; F16C 35/06; F16C 35/067; F16C 35/07; F16C 43/04; F16C 2360/23
See application file for complete search history.

(56) References Cited

U.S. PATENT DOCUMENTS

| | | | |
|---|---|---|---|
| 2,921,655 | A | 1/1960 | Mogregor |
| 4,523,864 | A | 6/1985 | Walter et al. |
| 5,466,107 | A | 11/1995 | Percival-Smith |
| 5,779,416 | A | 7/1998 | Sternitzky |
| 5,971,706 | A | 10/1999 | Glista et al. |
| 6,579,010 | B2 | 6/2003 | Trapp et al. |
| 7,797,936 | B2 | 9/2010 | Hayashi et al. |
| 9,447,817 | B2 | 9/2016 | Gallimore et al. |
| 2009/0034896 | A1 | 2/2009 | Fisher et al. |
| 2015/0240867 | A1* | 8/2015 | Amador ............... F01D 25/164 384/535 |
| 2016/0341073 | A1* | 11/2016 | Carter .................. F16C 35/067 |

* cited by examiner

*Primary Examiner* — James Pilkington
(74) *Attorney, Agent, or Firm* — General Electric Company; Pamela A. Kachur

(57) ABSTRACT

A bearing assembly for use in a rotating machine includes a housing and a retention nut threadably coupled to the housing and including a first retention mechanism. The bearing assembly also includes a retention bolt coupled to the housing and including a second retention mechanism configured to engage the first retention mechanism to maintain engagement of the retention nut with the housing.

19 Claims, 7 Drawing Sheets

TURBINE ENGINE BEARING ASSEMBLY AND METHOD FOR ASSEMBLING THE SAME

BACKGROUND

The present disclosure relates generally to turbine engines and, more specifically, to a turbine engine with a bearing assembly including retention mechanisms for maintaining engagement of a housing and an annular bearing retention nut.

Gas turbine engines typically include a compressor, a combustor, and at least one turbine. The compressor may compress air, which may be mixed with fuel and channeled to the combustor. The mixture may then be ignited for generating hot combustion gases, and the combustion gases may be channeled to the turbine. The turbine may extract energy from the combustion gases for powering the compressor, as well as producing useful work to propel an aircraft in flight, such as by driving a fan or propeller, or to power a load, such as an electrical generator.

Rotating turbomachinery, such as that found in gas turbine engines, frequently contains one or more bearing assemblies to support rotating components within stationary housings or between or within other rotating apparatus. Such bearing assemblies typically feature one or more bearing retainers to secure the bearing in place relative to other structures. Bearing retainers may be removable to permit initial assembly and/or repair of elements of the bearing assembly.

Removable bearing retainers often take the form of a nut or collar threadably engaged externally or internally on the end of a shaft or housing. When the shaft or housing is subjected to significant cyclic loads or other radial motion under certain operating conditions, large deflections or distortion of the shaft or housing can occur which diminishes the contact between contacting surfaces of the bearing retainer and the shaft or housing. This diminished contact can lead to the bearing retainer "jumping threads" or otherwise moving axially relative to the shaft or housing and allowing the bearing to move from its installed position due to the loss of positive retention.

BRIEF DESCRIPTION

In another aspect, a bearing assembly for use in a turbine engine is provided. The bearing assembly includes a housing and a retention nut threadably coupled to the housing and including a first retention mechanism. The bearing assembly also includes a retention bolt coupled to the housing and including a second retention mechanism configured to engage the first retention mechanism to maintain engagement of the retention nut with the housing.

In one aspect of the disclosure, which may include at least a portion of the subject matter of any of the preceding and/or following examples and aspects, the first retention mechanism includes a first surface of the retention nut, wherein the first surface is oriented obliquely with respect to the axis of rotation.

In one aspect of the disclosure, which may include at least a portion of the subject matter of any of the preceding and/or following examples and aspects, the second retention mechanism includes a second surface of the retention bolt, wherein the second surface is oriented obliquely with respect to the axis of rotation.

In one aspect of the disclosure, which may include at least a portion of the subject matter of any of the preceding and/or following examples and aspects, the first surface includes a forward surface of the retention nut, and wherein the second surface includes an aft surface of the retention bolt.

In one aspect of the disclosure, which may include at least a portion of the subject matter of any of the preceding and/or following examples and aspects, the first surface is substantially parallel to the second surface.

In one aspect of the disclosure, which may include at least a portion of the subject matter of any of the preceding and/or following examples and aspects, the retention bolt includes a locating feature configured to engage at least one of the retention nut and the housing.

In one aspect of the disclosure, which may include at least a portion of the subject matter of any of the preceding and/or following examples and aspects, the locating feature causes a gap to be formed between the first retention mechanism and the second retention mechanism.

In one aspect of the disclosure, which may include at least a portion of the subject matter of any of the preceding and/or following examples and aspects, the retention bolt includes a shaft configured to extend through an opening in the housing and a head coupled to the shaft and configured to engage the retention nut, wherein the head includes the second retention mechanism.

In one aspect of the disclosure, which may include at least a portion of the subject matter of any of the preceding and/or following examples and aspects, the head is substantially L-shaped.

In one aspect of the disclosure, which may include at least a portion of the subject matter of any of the preceding and/or following examples and aspects, the first retention mechanism is spaced from the second retention mechanism to define a gap therebetween in a first operating condition, and wherein the first retention mechanism engages the second retention mechanism in a second operating condition.

In one aspect of the disclosure, which may include at least a portion of the subject matter of any of the preceding and/or following examples and aspects, the second retention mechanism includes a lip configured to engage an inner surface of the retention nut.

In one aspect of the disclosure, which may include at least a portion of the subject matter of any of the preceding and/or following examples and aspects, the retention nut includes a plurality of circumferentially-spaced teeth that define a slot between a pair of adjacent teeth, and wherein the lip is configured to engage a surface of the slot.

In one aspect of the disclosure, which may include at least a portion of the subject matter of any of the preceding and/or following examples and aspects, at least one anti-rotation device extending through the housing and the retention nut.

In one aspect of the disclosure, which may include at least a portion of the subject matter of any of the preceding and/or following examples and aspects, the at least one anti-rotation device includes a plurality of circumferentially-spaced anti-rotation device extending through the housing and the retention nut.

In yet another aspect, a method of assembling a bearing assembly for use in a turbine engine is provided. The method includes threadably coupling a retention nut to a housing, wherein the retention nut includes a first retention mechanism. The method also includes coupling a retention bolt to the housing. Coupling the retention bolt to the housing includes coupling a second retention mechanism of the retention bolt proximate the first retention mechanism such that the second retention mechanism is configured to engage the first retention mechanism to maintain engagement of the retention nut with the housing.

In one aspect of the disclosure, which may include at least a portion of the subject matter of any of the preceding and/or following examples and aspects, coupling the second retention mechanism proximate the first retention mechanism includes coupling a first obliquely oriented surface of the retention bolt proximate a second obliquely oriented surface of the retention nut.

In one aspect of the disclosure, which may include at least a portion of the subject matter of any of the preceding and/or following examples and aspects, coupling the second retention mechanism proximate the first retention mechanism includes coupling the second retention mechanism proximate the first retention mechanism to define a gap therebetween.

In one aspect of the disclosure, which may include at least a portion of the subject matter of any of the preceding and/or following examples and aspects, the second retention mechanism proximate the first retention mechanism includes coupling a lip of the retention bolt to an inner surface of the retention nut.

In one aspect of the disclosure, which may include at least a portion of the subject matter of any of the preceding and/or following examples and aspects, coupling a retention bolt to the housing includes coupling the retention bolt to the housing such that a locating feature of the retention bolt engages at least one of the housing and the retention nut to form a gap between the first retention mechanism and the second retention mechanism.

In one aspect of the disclosure, which may include at least a portion of the subject matter of any of the preceding and/or following examples and aspects, further comprising coupling at least one anti-rotation device to the housing and to the retention nut.

DRAWINGS

These and other features, aspects, and advantages of the present disclosure will become better understood when the following detailed description is read with reference to the accompanying drawings in which like characters represent like parts throughout the drawings, wherein.

Figure 1:
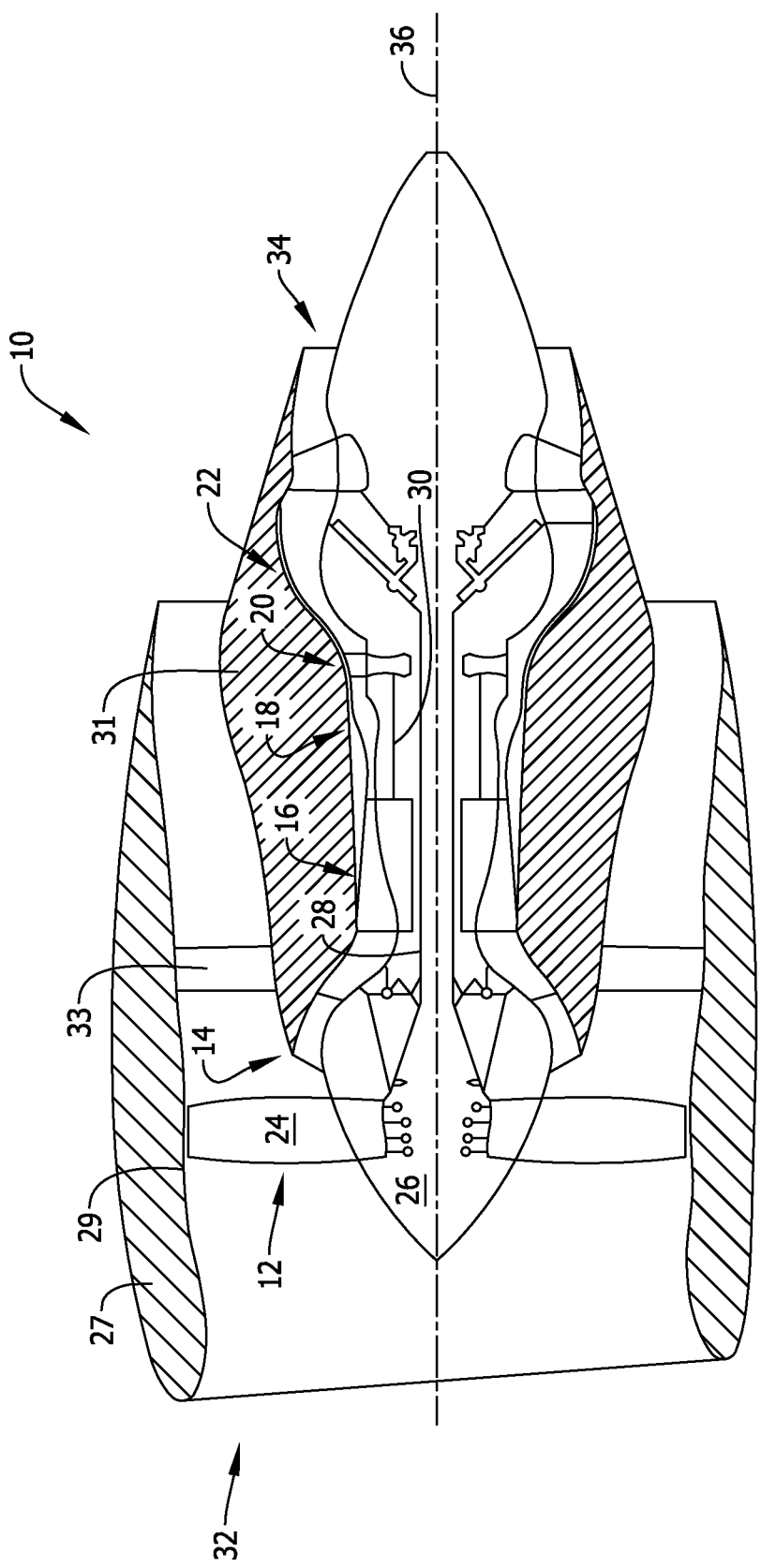
FIG. 1 is a schematic illustration of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to turbine engines with a bearing assembly including retention mechanisms for maintaining engagement of a housing and an annular bearing retention nut. More specifically, the bearing assembly for use in a turbine engine includes a housing and a retention nut threadably coupled to the housing and including a first retention mechanism. The bearing assembly also includes a retention bolt coupled to the housing and including a second retention mechanism configured to engage the first retention mechanism to maintain engagement of the retention nut with the housing. The bearing assembly described herein provides a high load capacity method of nut retention that reduces the physical space required in the engine compared to other retention assemblies, reduces the overall weight of the turbine engine compared to other retention assemblies, and reduces the manufacturing time and costs compared to other retention assemblies While the following embodiments are described in the context of a turbofan engine, it should be understood that the systems and methods described herein are also applicable to turboprop engines, turboshaft engines, turbojet engines, and ground-based turbine engines, for example.

FIG. 1 is a schematic diagram of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26 toward a nacelle 27 that includes a fan case 29. A turbine case 31 extends circumferentially around low-pressure or booster compressor assembly 14, a high-pressure compressor assembly 16, and a combustor assembly 18, high-pressure turbine assembly 20, and low-pressure turbine assembly 22. Turbine engine also includes an outlet guide vane 33 positioned aft of fan assembly 12 and extending from turbine case 31 to fan case 29. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes an axis 36 about which fan assembly 12, booster compressor assembly 14, high-pressure compressor assembly 16, and turbine assemblies 20 and 22 rotate.

In operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
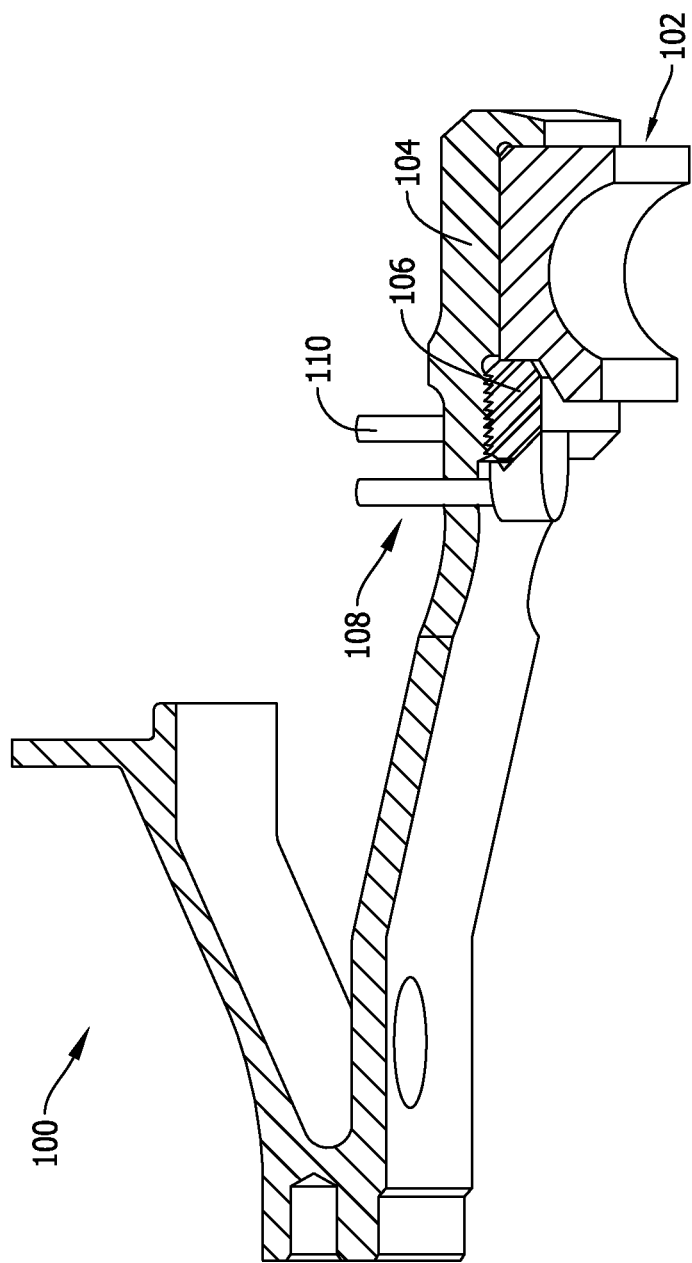
FIG. 2 is a partial cut-away cross-sectional view of an exemplary bearing assembly that may be used with the gas turbine engine shown in FIG. 1.
Figure 3:
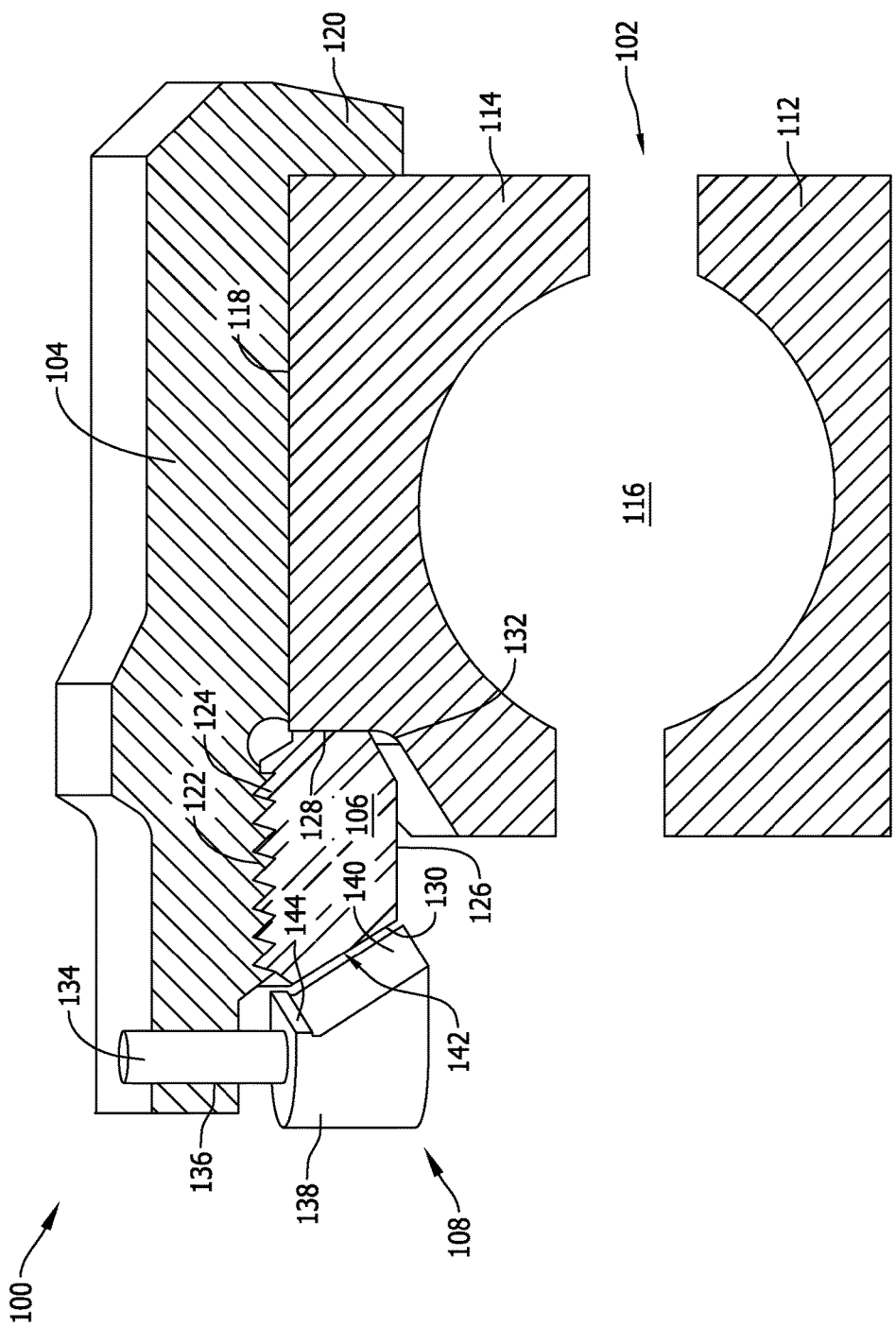
FIG. 3 is an enlarged partial view of the bearing assembly of FIG. 2.

As shown in FIG. 2, turbine engine 10 includes a bearing assembly 100. Bearing assembly 100 includes a bearing 102, a bearing housing 104, a bearing retention nut 106, a bearing retention bolt 108, and an anti-rotation device 110. Bearing 102 includes an inner race 112 and an outer race 114 that define a cavity 116 configured to receive a bearing (not shown) therein. Outer race 114 is coupled to a bearing receiving surface 118 on housing 104. Housing 104 also includes a flange 120 for retaining an axial position of outer race 114 and a threaded surface 122 that is threadably engaged with a threaded surface 124 of retention nut 106. Threaded surface 122 engages threaded surface 124 to secure retention nut 106 to housing 104. Threaded surfaces 122 and 124 are configured so that such engagement is releasable, such that retention nut 106 and housing 104 are removably secured to one another. Removable securement allows for assembly of the components as well as disassembly for repair or replacement of components.

In the exemplary embodiment, retention nut 106 is formed as an annular spanner nut and includes a threaded surface 124, an inner surface 126, an aft surface 128 and a first retention mechanism 130. First retention mechanism 130 includes a first surface 131 (also referred to herein as a forward surface) of retention nut 106. Aft surface 128 is coupled to outer race 114 of bearing 102. More specifically, outer race 114 includes a notch 132 formed therein and aft surface 128 of retention nut 106 is coupled to outer race 114 at notch 132. Retention bolt 108 includes a shaft portion 134 that is inserted into an opening 136 in housing 104 and a head portion 138 that is coupled to shaft portion 134 and that engages retention nut 106. Retention bolt 108 may be formed using any suitable manufacturing method. For example, retention bolt 108 may be unitarily formed from a single piece of material or may be formed from two or more, i.e., multiple, individual elements which are joined together via any method suitable for the material or materials to be joined. By way of example, shaft portion 134 and head portion 138 may be unitarily formed from a single forging and machined as necessary to impart the desired geometry and surface finish. As another example, shaft portion 134 and head portion 138 may be formed of two or more separate pieces of material which are coupled to one another, such as threading, brazing, soldering, or welding.

In the exemplary embodiment, head portion 138 of retention bolt 108 includes a second retention mechanism 140 positioned on a second surface 141 (also referred to herein as an aft surface) of head portion 138. Second retention mechanism 140 is positioned proximate first retention mechanism 130 of retention nut 106. More specifically, first surface 131 of first retention mechanism 130 is a forward surface of retention nut 106 and second surface 141 of second retention mechanism 140 is an aft surface of retention bolt 108. As shown in FIG. 2, second retention mechanism 140 is configured to engage first retention mechanism 130 to maintain engagement of retention nut 106 with housing 104. In the exemplary embodiment, first and second retention mechanisms 130 and 140 are sloped surfaces of retention nut 106 and retention bolt 108, respectively, that are each oriented obliquely with axis 36 (shown in FIG. 1). As shown in FIG. 2, mechanisms 130 and 140 are substantially parallel to each other and are also spaced apart to define an obliquely oriented gap 142 therebetween. More specifically, head portion 138 includes a locating feature 144 positioned proximate shaft portion 134 that engages retention nut 106 and/or housing 104 such that second retention mechanism 140 is spaced away from first retention mechanism 130 to define gap 142 therebetween. Locating feature 144 includes a vertical surface that engages retention nut 106 and/or housing 104 proximate threaded surfaces 122 and 124 during assembly of bearing assembly 100 to prevent axial movement of retention nut 206 and to form gap 142.

In operation, first retention mechanism 130 is spaced away from second retention mechanism 140 during standard operating conditions. During other conditions, such as fan blade out conditions, second retention mechanism 140 engages first retention mechanism 130 to maintain engagement of retention nut 106 with housing 104. More specifically, during some operating conditions, housing 104 may ovalize and move radially away from retention nut 106. Retention bolt 108 is pulled radially with housing 104 because of the engagement between shaft portion 134 and housing 104. As retention bolt 108 travels, gap 142 is closed and second retention mechanism 140 engages first retention mechanism 130 and thus pulls retention nut 106 along with it, thereby keeping threads of threaded surface 124 of retention nut 106 engaged with threads of threaded surface 122 of housing 104. The amount of thread disengagement before retention nut 106 fully moves with housing 104 is controlled by the size of gap 142 between second retention mechanism 140 and first retention mechanism 130. The smaller the gap the more certain it is that retention nut 106 will follow retention bolt 108 and housing 104 other during deformation. Therefore, gap 142 is minimized but designed so as not to close during all anticipated normal assembly and operating conditions. Locating feature 144 ensures that gap 142 is as small as possible during assembly by engaging retention nut 106 and/or housing 104 to form gap 142.

As shown in FIG. 1, anti-rotation device 110 is included to prevent retention nut 106 from rotating during vibrations and other forces encountered during gas turbine engine operation. This in turn prevents retention nut 106 from loosening due to rotating and following the threads on the contacting surface away from the fully-seated position. Any type of positive retention feature may be utilized, such as a bolt, screw, cotter pin, key and keyway, lockwire, or polymeric anti-rotation compound such as may be commercially available. In the exemplary embodiment shown, anti-rotation device 110 takes the form of a bolt with a complementary nut. Apertures may be provided in housing 104 and in retention nut 106 as needed for installation of anti-rotation device 110. Depending upon the type of anti-rotation device required for the particular installation, anti-rotation device 110 may include a single device or a plurality of devices, and accordingly may require a single aperture, slot, or other anchoring mechanism or a plurality of such anchoring mechanisms to be provided in retention nut 106.

Figure 4:
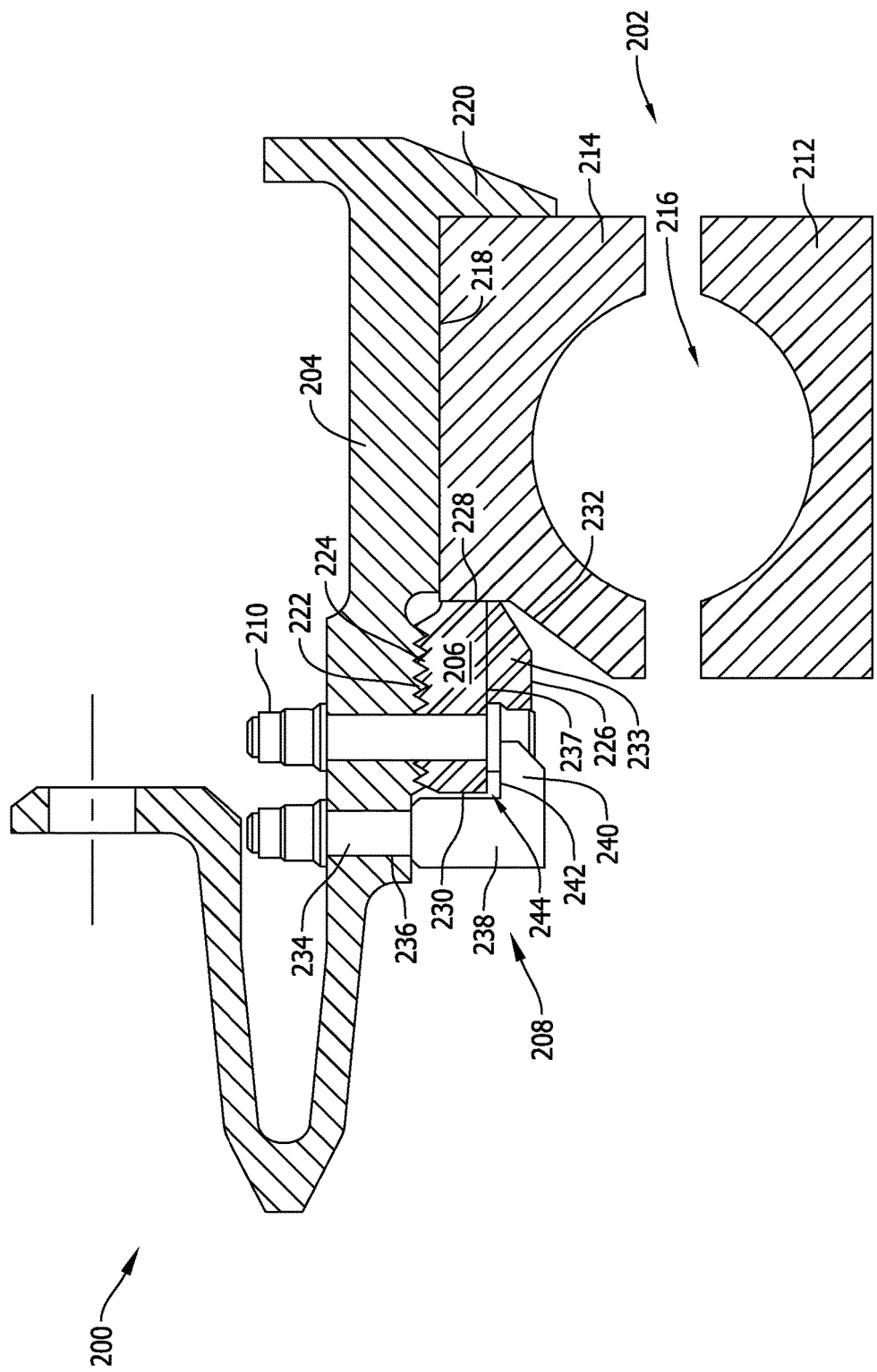
FIG. 4 is a view similar to FIG. 2 of another embodiment of a bearing assembly.
Figure 5:
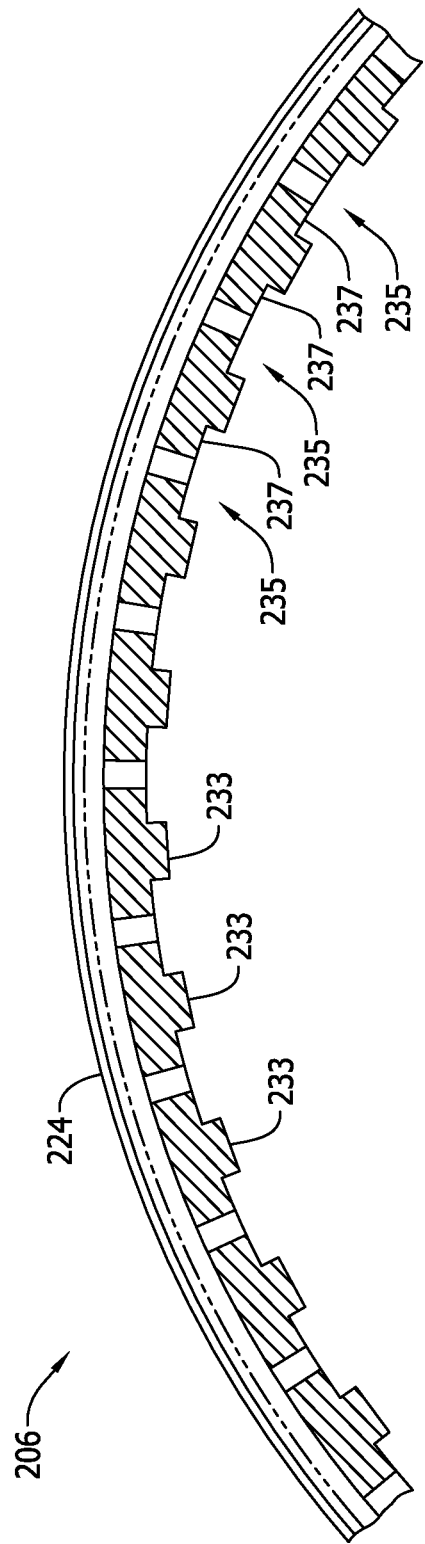
FIG. 5 is a cross-sectional view of a portion of a retention nut for use with the bearing assembly shown in FIG. 4.

FIG. 4 is a cross-sectional view of another embodiment of a bearing assembly 200 including a bearing 202, a bearing housing 204, a bearing retention nut 206, a bearing retention bolt 208, and an anti-rotation device 210. FIG. 5 is a cross-sectional view of a portion of retention nut 206 for use with bearing assembly 200 (shown in FIG. 4). Bearing 202 includes an inner race 212 and an outer race 214 that define a cavity 216 configured to receive a bearing (not shown) therein. Outer race 214 is coupled to a bearing receiving surface 218 on housing 204. Housing 204 also includes a flange 220 for retaining an axial position of outer race 214 and a threaded surface 222 that is threadably engaged with a threaded surface 224 of retention nut 206. Threaded surface 222 engages threaded surface 224 to secure retention nut 206 to housing 204. Threaded surfaces 222 and 224 are configured so that such engagement is releasable, such that retention nut 206 and housing 204 are removably secured to one another. Removable securement allows for assembly of the components as well as disassembly for repair or replacement of components.

In the exemplary embodiment, retention nut 206 is formed as an annular spanner nut and includes a threaded surface 224, an inner surface 226, an aft surface 228 and a forward surface 230. Aft surface 228 is coupled to outer race 214 of bearing 202. More specifically, outer race 214 includes a notch 232 formed therein and aft surface 228 of retention nut 206 is coupled to outer race 214 at notch 232. As shown in FIG. 5, retention nut 206 also includes a plurality of circumferentially-spaced teeth 233 and a plurality of circumferentially-spaced slots 235 such that each slot 235 is defined between a pair of adjacent teeth 233. Teeth 233 define inner surface 226, while slots 235 include a first retention mechanism 237 defined on a slot inner surface located radially between teeth inner surface 226 and threaded surface 224.

Retention bolt 208 includes a shaft portion 234 that is inserted into an opening 236 in housing 204 and a head portion 238 that is coupled to shaft portion 234 and that engages retention nut 206. Retention bolt 208 may be formed using any suitable manufacturing method. For example, retention bolt 208 may be unitarily formed from a single piece of material or may be formed from two or more, i.e., multiple, individual elements which are joined together via any method suitable for the material or materials to be joined. By way of example, shaft portion 234 and head portion 238 may be unitarily formed from a single forging and machined as necessary to impart the desired geometry and surface finish. As another example, shaft portion 234 and head portion 238 may be formed of two or more separate pieces of material which are coupled to one another, such as threading, brazing, soldering, or welding.

In the exemplary embodiment, head portion 238 of retention bolt 208 includes a second retention mechanism 240 having a lip 241 that extends afterward such that head portion 238 is substantially L-shaped. Second retention mechanism 240 extends beneath retention nut 206 and includes a radially outer surface 242 positioned proximate first retention mechanism 237 of retention nut 206. More specifically, first retention mechanism 237 includes an inner surface of retention nut 206 and second retention mechanism 240 includes lip 241 of retention bolt 208. As shown in FIG. 4, surface 242 of second retention mechanism 240 is configured to engage first retention mechanism 237 to maintain engagement of retention nut 206 with housing 204. In the exemplary embodiment, the L-shape of second retention mechanism 240 extends axially beneath retention nut 206 and between adjacent teeth 233 of retention nut 206 such that second retention mechanism 240 is positioned within a slot 235 of retention nut 206. As shown in FIG. 4, first retention mechanism 237 and surface 242 of second retention mechanism 240 are substantially parallel to each other and are also spaced apart to define a gap 244 therebetween.

In operation, first retention mechanism 237 is spaced away from second retention mechanism 240 to define gap 244 during standard operating conditions. During other conditions, such as fan blade out conditions, second retention mechanism 240 engages first retention mechanism 237 to maintain engagement of retention nut 206 with housing 204. More specifically, during some operating conditions, housing 204 may ovalize and move radially away from retention nut 206. Retention bolt 208 is pulled radially with housing 204 because of the engagement between shaft portion 234 and housing 204. As retention bolt 208 travels, gap 244 is closed and surface 242 of second retention mechanism 240 engages first retention mechanism 237 such that the L-shape of second retention mechanism 240 pulls retention nut 206 along with it, thereby keeping threads of threaded surface 224 of retention nut 206 engaged with threads of threaded surface 222 of housing 204. The amount of thread disengagement before retention nut 206 fully moves with housing 204 is controlled by the size of gap 244 between second retention mechanism 240 and first retention mechanism 237. The smaller the gap 244 the more certain it is that retention nut 206 will follow retention bolt 208 and housing 204 other during deformation. Therefore, gap 244 is minimized but designed so as not to close during assembly and standard operating conditions.

As shown in FIG. 4, anti-rotation device 210 is included to prevent retention nut 206 from rotating during vibrations and other forces encountered during gas turbine engine operation. This in turn prevents retention nut 206 from loosening due to rotating and following the threads on the contacting surface away from the fully-seated position. Any type of positive retention feature may be utilized, such as a bolt, screw, cotter pin, key and keyway, lockwire, or polymeric anti-rotation compound such as may be commercially available. In the exemplary embodiment shown, anti-rotation device 210 takes the form of a bolt with a complementary nut. Apertures may be provided in housing 204 and in retention nut 206 as needed for installation of anti-rotation device 210. Depending upon the type of anti-rotation device required for the particular installation, anti-rotation device 210 may include a single device or a plurality of devices, and accordingly may require a single aperture, slot, or other anchoring mechanism or a plurality of such anchoring mechanisms to be provided in retention nut 206.

The bearing nuts described herein may be made of any material known in the art. Typical materials may be AMS 5643 stainless steel or any other steel alloy such as AMS 6414, nickel steels such as INCO 718, or titanium alloys. The choice of the material depends upon thermal, load, assembly, and operating environment and mating material, but is not limited to any particular material or class of materials.

Figure 6:
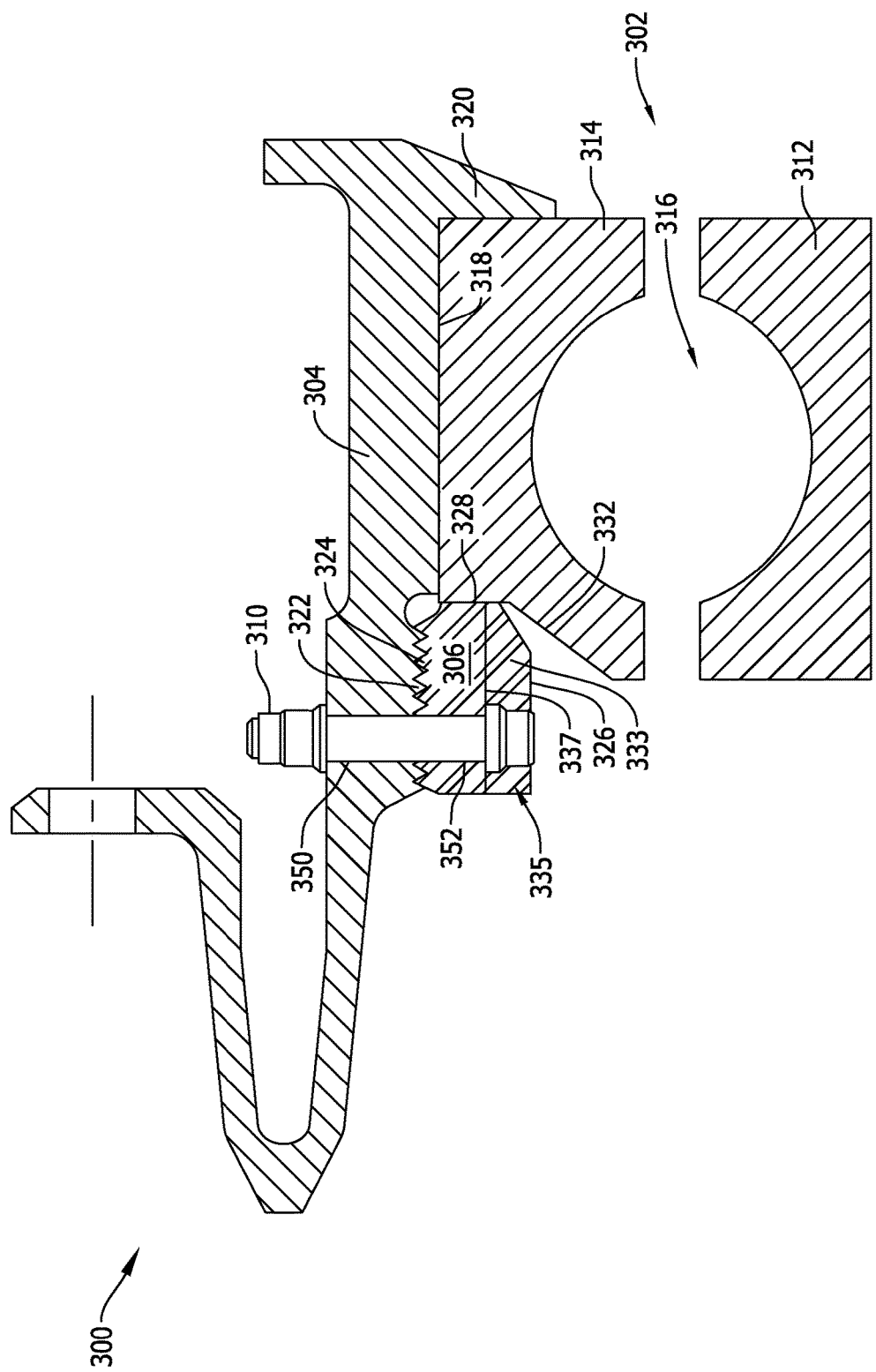
FIG. 6 is a view similar to FIG. 2 of another embodiment of a bearing assembly.
Figure 7:
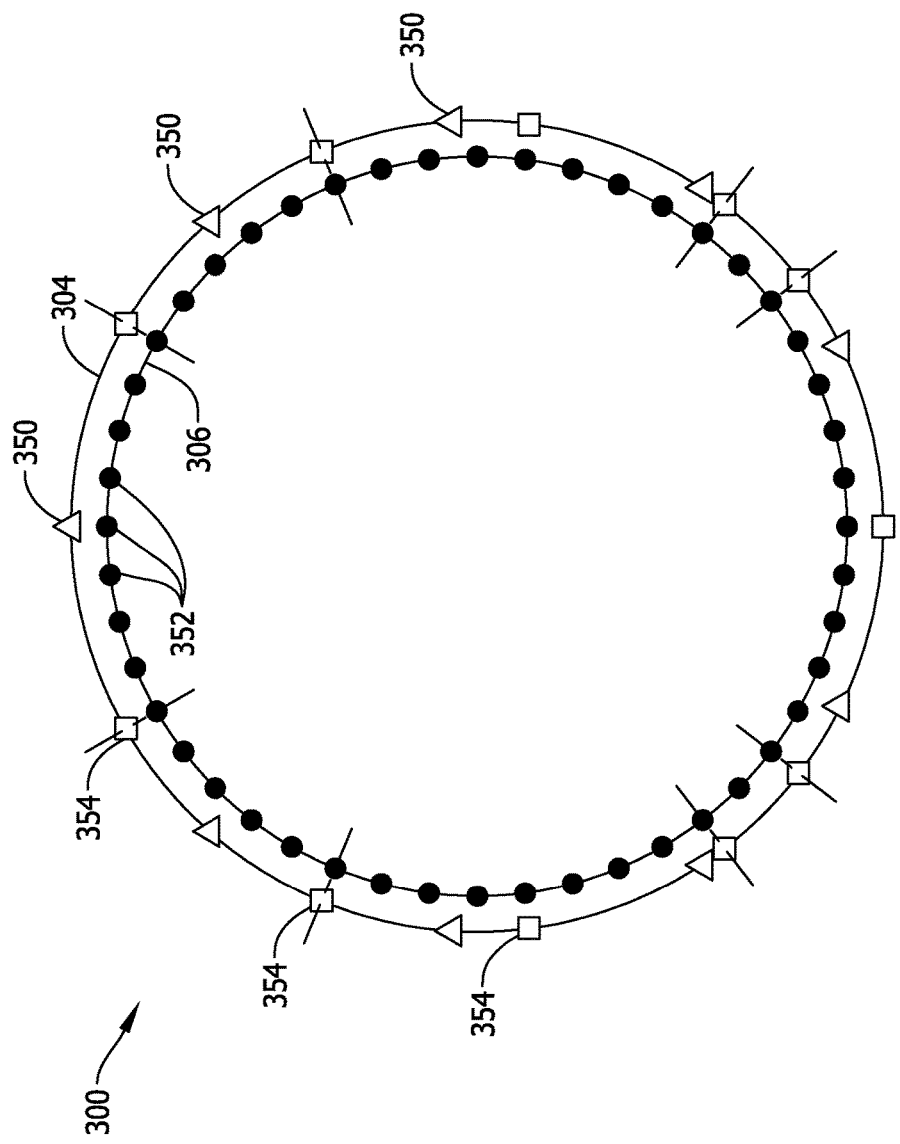
FIG. 7 is a schematic view of an annular housing and retention nut for use with the bearing assembly shown in FIG. 6.

FIG. 6 is a cross-sectional view of another embodiment of a bearing assembly 300 including a bearing 302, a bearing housing 304, a bearing retention nut 306, and a plurality of anti-rotation devices 310. FIG. 7 is a schematic view of annular housing 304 and retention nut 306 for use with bearing assembly 300. Bearing 302 includes an inner race 312 and an outer race 314 that define a cavity 316 configured to receive a bearing (not shown) therein. Outer race 314 is coupled to a bearing receiving surface 318 on housing 304. Housing 304 also includes a flange 320 for retaining an axial position of outer race 314 and a threaded surface 322 that is threadably engaged with a threaded surface 324 of retention nut 306. Threaded surface 322 engages threaded surface 324 to secure retention nut 306 to housing 304. Threaded surfaces 322 and 324 are configured so that such engagement is releasable, such that retention nut 306 and housing 304 are removably secured to one another. Removable securement allows for assembly of the components as well as disassembly for repair or replacement of components.

In the exemplary embodiment, retention nut 306 is formed as an annular spanner nut and includes a threaded surface 324, an inner surface 326, an aft surface 328 and a forward surface 330. Aft surface 328 is coupled to outer race 314 of bearing 302. More specifically, outer race 314 includes a notch 332 formed therein and aft surface 328 of retention nut 306 is coupled to outer race 314 at notch 332. Retention nut 306 also includes a plurality of circumferentially-spaced teeth 333 and a plurality of circumferentially-spaced slots 335 such that each slot 335 is defined between a pair of adjacent teeth 333. Teeth 333 define inner surface 326, while slots 335 include a slot inner surface 337 located radially between teeth inner surface 326 and threaded surface 324.

As shown in FIG. 6, anti-rotation devices 310 extend through both a housing opening 350 and a nut opening 352 to couple anti-rotation devices 310 to housing 304 and retention nut 306. Nut opening 352 is defined through retention nut 306 in each slot of slots 335. Anti-rotation devices 310 are included to prevent retention nut 306 from rotating during vibrations and other forces encountered during gas turbine engine operation. This in turn prevents retention nut 306 from loosening due to rotating and following the threads on the contacting surface away from the fully-seated position. Any type of positive retention feature may be utilized, such as a bolt, screw, cotter pin, key and keyway, lockwire, or polymeric anti-rotation compound such as may be commercially available. In the exemplary embodiment shown, anti-rotation devices 310 take the form of a bolt with a complementary nut.

As shown in FIG. 7, a first plurality of housing openings 350 (represented in FIG. 7 by a triangle symbol) is drilled through housing 304 and a second plurality of nut openings 352 (represented in FIG. 7 by a circle symbol) is drilled through retention nut 306. In conventional assemblies, only one opening of each plurality of openings 350 and 352 needs to align when retention nut 306 is coupled to housing 304 to insert a single anti-rotation device 310. In the exemplary embodiment, once the first device 310 is inserted through the aligned openings 350 and 352, a third plurality of openings 354 (represented in FIG. 7 by a square symbol) is match drilled through housing 304 such that each of the third plurality of openings 354 align with an opening of the second plurality of openings 352 in retention nut 306. More specifically, each opening of the third plurality of openings 354 is drilled approximately 30 degrees apart around housing 304. Generally, each opening of the third plurality of openings 354 is drilled any distance apart that facilitates operation of bearing assembly 300 as described herein. Accordingly, bearing assembly 300 includes a plurality of anti-rotation devices 310 circumferentially-spaced about housing 304 and retention nut 306.

In operation, the plurality of equally-spaced anti-rotation devices 310 maintains engagement of retention nut 306 with housing 304. More specifically, during some operating conditions, housing 304 may ovalize and move radially away from retention nut 306. Anti-rotation devices 310 are pulled radially with housing 304 because of the engagement between anti-rotation devices 310 and housing 204. As anti-rotation devices 310 travels, the nut of each anti-rotation device 310 engages retention nut 306 and thus pulls retention nut 306 along with it, thereby keeping threads of threaded surface 324 of retention nut 306 engaged with threads of threaded surface 322 of housing 304.

An exemplary technical effect of the assembly and methods described herein includes at least one of: (a) reducing the weight of the turbine engine by having a plurality of retention bolts spaced along the housing circumference rather than a continuous annular structure coupled to the retention nut; (b) reducing the manufacturing time and costs compared to other retention assemblies; and c) reducing the physical space required in the engine compared to other retention assemblies allowing for additional space for other components.

Bearing retainers of the type described herein may be useful in other installations besides gas turbine engines. For example, such retainers may be utilized in the automotive field or any other field where it is desired to retain a bearing in position during operation. The technology described herein may be applicable to any rotating machinery application where high load events may be of concern. Although initially envisioned and developed for rotating machinery, there may be potential for use on static machinery as well.

Exemplary embodiments of a containment assembly for use with a turbine engine and related components are described above in detail. The assembly is not limited to the specific embodiments described herein, but rather, components of systems and/or steps of the methods may be utilized independently and separately from other components and/or steps described herein. For example, the configuration of components described herein may also be used in combination with other processes, and is not limited to practice with a fan section of a turbine engine. Rather, the exemplary embodiment can be implemented and utilized in connection with many applications where providing smooth load transition between components in an assembly is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing assembly for use with a rotating machine having an axis of rotation, said bearing assembly comprising:
   a housing;
   a retention nut threadably coupled to said housing and comprising a first retention mechanism; and
   a retention bolt coupled to said housing and comprising a second retention mechanism configured to engage said first retention mechanism to maintain engagement of said retention nut with said housing;
   wherein said first retention mechanism comprises a first surface of said retention nut, wherein said first surface is oriented obliquely with respect to the axis of rotation.

2. The bearing assembly in accordance with claim 1, wherein said second retention mechanism comprises a second surface of said retention bolt, wherein said second surface is oriented obliquely with respect to the axis of rotation.

3. The bearing assembly in accordance with claim 2, wherein said first surface is substantially parallel to said second surface.

4. The bearing assembly in accordance with claim 1, wherein said retention bolt comprises a locating feature configured to engage at least one of said retention nut and said housing.

5. The bearing assembly in accordance with claim 4, wherein said locating feature causes a gap to be formed between said first retention mechanism and said second retention mechanism.

6. The bearing assembly in accordance with claim 1, wherein said retention bolt comprises:
   a shaft configured to extend through an opening in said housing; and
   a head coupled to said shaft and configured to engage said retention nut, wherein said head comprises said second retention mechanism.

7. The bearing assembly in accordance with claim 1, wherein said first retention mechanism is spaced from said second retention mechanism to define a gap therebetween in a first operating condition, and wherein said first retention mechanism engages said second retention mechanism in a second operating condition.

8. The bearing assembly in accordance with claim 1, further comprising at least one anti-rotation device extending through said housing and said retention nut.

9. The bearing assembly in accordance with claim 8, wherein said at least one anti-rotation device comprises a plurality of circumferentially-spaced anti-rotation devices extending through said housing and said retention nut.

10. A bearing assembly for use with a rotating machine having an axis of rotation, said bearing assembly comprising:
    a housing;
    a retention nut threadably coupled to said housing and comprising a first retention mechanism;
    a retention bolt coupled to said housing;
    wherein said retention bolt comprises:
    a shaft configured to extend through an opening in said housing; and
    a head coupled to said shaft and configured to engage said retention nut, wherein said head comprises a second retention mechanism; and
    further wherein said head is substantially L-shaped.

11. The bearing assembly in accordance with claim 10, wherein said second retention mechanism comprises a lip configured to engage an inner surface of said retention nut.

12. The bearing assembly in accordance with claim 11, wherein said retention nut comprises a plurality of circumferentially-spaced teeth that define a slot between a pair of adjacent teeth, and wherein said lip is configured to engage a surface of said slot.

13. The bearing assembly in accordance with claim 10, further comprising at least one anti-rotation device extending through said housing and said retention nut.

14. A method of assembling a bearing assembly for use in a rotating machine, said method comprising:
    threadably coupling a retention nut to a housing, wherein the retention nut includes a first retention mechanism;
    coupling a retention bolt to the housing, wherein coupling the retention bolt to the housing comprises coupling a second retention mechanism of the retention bolt proximate the first retention mechanism such that the second retention mechanism is configured to engage the first retention mechanism to maintain engagement of the retention nut with the housing;
    wherein coupling the second retention mechanism proximate the first retention mechanism comprises coupling a first obliquely oriented surface of the retention bolt proximate a second obliquely oriented surface of the retention nut.

15. The method in accordance with claim 14, wherein coupling the second retention mechanism proximate the first retention mechanism comprises coupling the second retention mechanism proximate the first retention mechanism to define a gap therebetween.

16. The method in accordance with claim 14, wherein coupling the second retention mechanism proximate the first retention mechanism comprises coupling a lip of the retention bolt to an inner surface of the retention nut.

17. The method in accordance with claim 14, wherein coupling the retention bolt to the housing comprises coupling the retention bolt to the housing such that a locating feature of the retention bolt engages at least one of the housing and the retention nut to form a gap between the first retention mechanism and the second retention mechanism.

18. The method in accordance with claim 14, further comprising coupling at least one anti-rotation device to the housing and to the retention nut.

19. A method of assembling a bearing assembly for use in a rotating machine, said method comprising:
    threadably coupling a retention nut to a housing, wherein the retention nut includes a first retention mechanism;
    coupling a retention bolt to the housing;
    coupling a second retention mechanism of the retention bolt proximate the first retention mechanism such that the second retention mechanism is configured to engage the first retention mechanism to maintain engagement of the retention nut with the housing such that a locating feature of the retention bolt engages at least one of the housing and the retention nut to form a gap between the first retention mechanism and the second retention mechanism.

* * * * *